United States Patent
Bauer

[11] 3,890,708
[45] June 24, 1975

[54] COMPASS SAW

[75] Inventor: Friedrich Bauer, Wolfschulgen, Germany

[73] Assignee: Metabowerke KG Closs, Rauch, & Schnitzler, Nurtingen, Germany

[22] Filed: July 18, 1973

[21] Appl. No.: 380,165

[30] Foreign Application Priority Data
July 21, 1972  Germany............................ 2235882

[52] U.S. Cl. ................................................. 30/393
[51] Int. Cl. ........................................... B27b 19/02
[58] Field of Search.................. 30/392, 393, 272 A

[56] References Cited
UNITED STATES PATENTS

| | | | |
|---|---|---|---|
| 2,588,477 | 3/1952 | Briggs | 30/392 |
| 2,639,737 | 5/1953 | Forsberg | 30/392 |
| 2,775,272 | 12/1956 | Papworth | 30/393 |
| 2,781,800 | 2/1957 | Papworth | 30/393 X |
| 2,917,088 | 12/1959 | Papworth | 30/393 |
| 2,931,402 | 4/1950 | Papworth | 30/393 |
| 3,388,728 | 6/1968 | Riley et al. | 30/392 |

*Primary Examiner*—Al Lawrence Smith
*Assistant Examiner*—K. J. Ramsey
*Attorney, Agent, or Firm*—Michael S. Striker

[57] ABSTRACT

A saw blade is attached to one end of a rod guided for reciprocation in longitudinal direction in a frame which is mounted pivotable about a pivot axis substantially normal to the direction of reciprocation of the rod in a housing. Counter-balancing means are provided in the housing for counter balancing the mass forces produced by the reciprocating rod and saw blade and a roller on the frame engages an inclined face on the counter-balancing means for causing oscillation of the frame about the pivot axis so that the saw blade in addition to its reciprocating movement will perform a movement transverse thereto.

13 Claims, 6 Drawing Figures

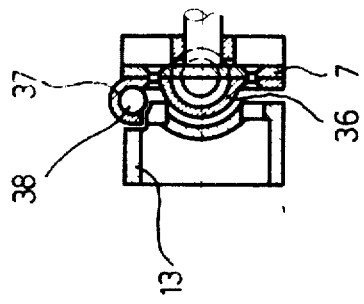
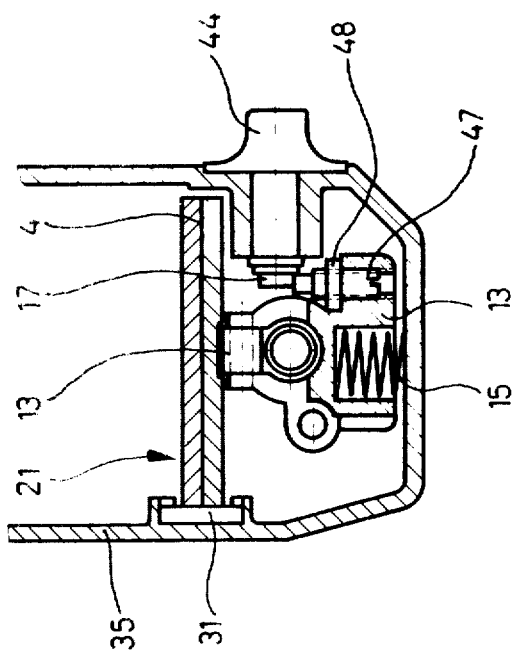

COMPASS SAW

BACKGROUND OF THE INVENTION

The present invention relates to compass saws in which the saw blade is fixed to one end of an elongated rod reciprocated by means of an eccentric from a drive shaft and in which counter-balancing means are provided for counter balancing the mass forces produced by the reciprocating rod and saw blade. The means mounting the rod for reciprocation in longitudinal direction are pivotably connected to the housing of the saw and means on the mounting means engage the counter-balancing means to cause oscillation of the mounting means about the pivot axis so that the rod and the saw blade connected thereto will perform in addition to the reciprocating movement also a movement transverse thereto.

In a compass saw of this type, known in the art, the counter-balancing means comprise two gears rotating in opposite directions and provided with balancing bodies extending through a certain angle of the gears. In this known saw, the means for causing an oscillating movement of the rod and saw blade connected thereto comprise a plurality of members driven by eccentrics and having an engaging portion engaging the back of the saw blade. This known arrangement which comprises a relatively large number of components is complicated and therefore expensive to manufacture and some of the components in this known construction are also subjected to considerable wear. For instance, the member which engages the back of the saw blade, to cause a pivoting movement of the mounting means of the rod carrying the saw blade, is located in the region where the sawdust is produced during operation of the saw, so that especially this member is subjected to considerable wear.

SUMMARY OF THE INVENTION

It is an object of the present invention to provide a compass saw of the aforementioned kind which is composed of relatively few and rugged parts so that the compass saw may be produced at reasonable cost and in which the various components of the compass saw are constructed and arranged in such a manner so as to reduce the wear of the components during operation.

With these and other objects in view, which will become apparent as the description proceeds, the compass saw according to the present invention mainly comprises a housing, a drive shaft rotatably mounted in said housing and provided with eccentric means, an elongated rod connected to said eccentric means to be reciprocated thereby, a saw blade fixed to one end of said rod for reciprocation therewith, rocking means mounted in the housing for pivoting movement about a pivot axis and guiding the rod for reciprocation in longitudinal direction, means in the housing for counter balancing the mass forces produced by the movement of the rod and the saw blade connected thereto, and means on the rocking means engaging the counter-balancing means to cause the rocking means to pivot about the pivot axis during reciprocating movement of the rod and the saw blade connected thereto.

Since the counter-balancing means and the rocking means with the engaging means thereon are mounted in the housing of the compass saw, these components are protected from the sawdust produced during operation of the saw so that the useful life of the compass saw is improved as compared with compass saws of this type known in the art. Furthermore, since the engaging means on the rocking means are in direct engagement with the counter-balancing means, the construction is greatly simplified so that the compass saw according to the present invention may be constructed at reasonable cost.

Preferably, the rocking means comprises a frame provided with means for guiding the rod in longitudinal direction and the engaging means preferably comprise a roller mounted on the frame while spring means between the housing and the frame are provided for biasing the frame about the pivot axis so as to press the roller against the counter-balancing means. The roller on the frame is turnable about an axis substantially normal to the longitudinal axis of the rod. The latter is preferably of circular cross section and cooperating means are provided on the rod and the housing to prevent turning of the rod about its axis.

The counter-balancing means preferably coman eccentric on the drive shaft and a balancing body reciprocated by the eccentric in opposition to the movement of the rod. The balancing body is preferably elongated and extends substantially parallel to the rod and is provided on one side thereof between the eccentric and the free end thereof with a face inclined to the direction of its elongation, which is engaged by the roller on the frame. The inclined face may be the bottom face of a groove provided in the elongated balancing body and the roller on the frame engages this bottom face of the groove, whereas the elongated balancing body is supported on the side thereof facing away from the groove by a roller mounted in the housing turnably about an axis which extends normal to the reciprocating direction of the elongated balancing body. The balancing body is provided with an elongated slot extending in a direction substantially normal to the direction of its reciprocation and the eccentric driving the balancing body is located in this slot. Means are further provided in the housing for guiding the elongated balancing body for movement in longitudinal direction and these means may comprise pairs of pins extending normal to the direction of movement of the balancing body and respectively engaging opposite side faces thereof. The balancing body may comprise two parallel plates abutting each other.

To adjust the pivoting movement of the frame about the aforementioned pivot axis, an additional eccentric may be provided in the housing which is turnable from the outside of the housing by means of an adjusting knob and a fine adjusting screw is preferably mounted on the frame and engaging the last mentioned eccentric.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a transverse cross section taken along the line V—V of FIG. 3; and

FIG. 6 is a partial cross section taken along the line VI—VI of FIG. 2.

DESCRIPTION OF THE PREFERRED EMBODIMENTS

Figure 1:
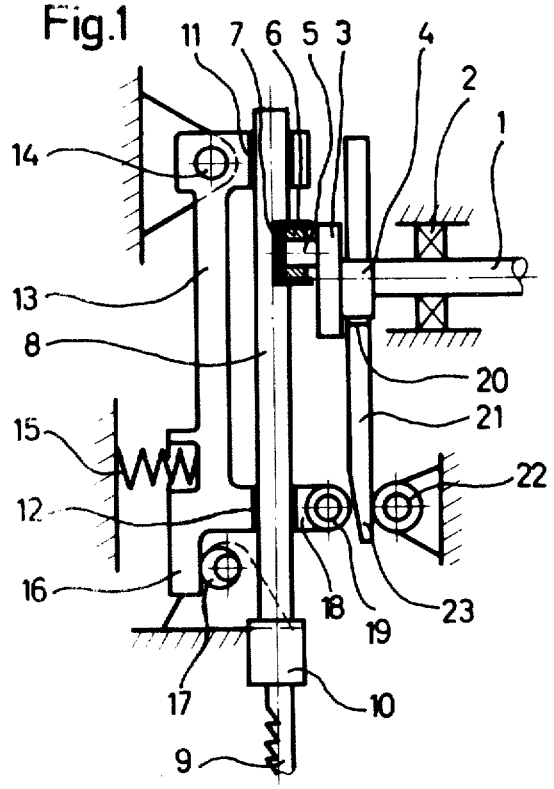
FIG. 1 is a schematic Figure illustrating the principle of the compass saw according to the present invention.
Figure 2:
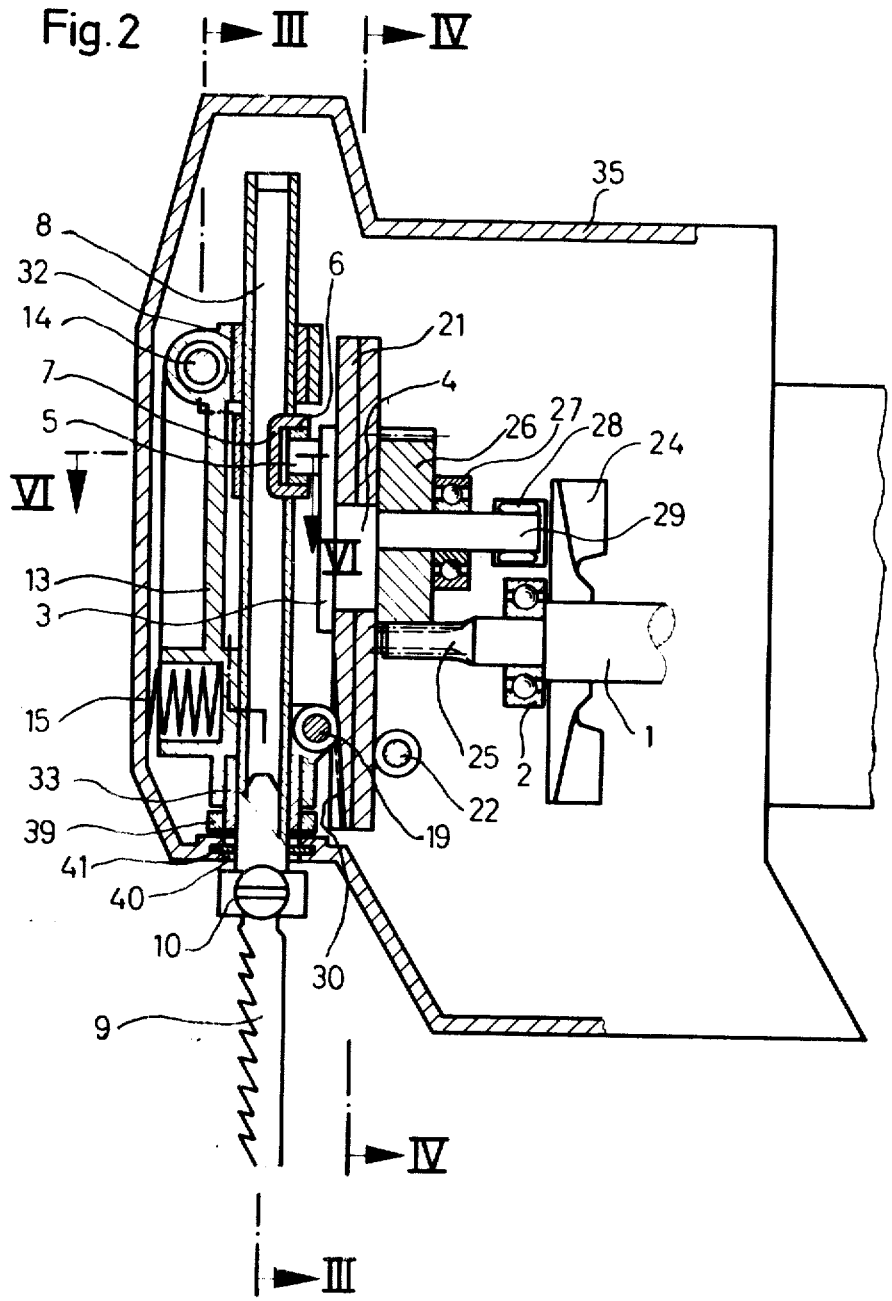
FIG. 2 is a longitudinal cross section through an embodiment of the compass saw according to the present invention.
Figure 4:
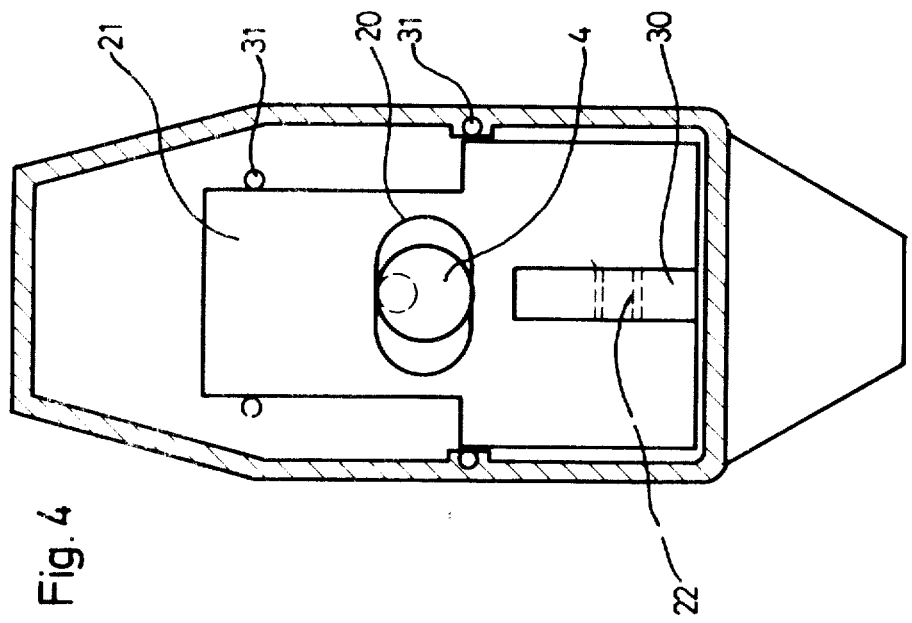
FIG. 4 is a cross section taken along the line IV—IV of FIG. 2.

Referring now to the drawing, and more specifically to FIG. 1 which schematically illustrates the basic principle of the compass saw according to the present invention, it will be seen that the compass saw may comprise a drive shaft 1 turnably mounted in a bearing 2 and driven from a motor, not shown in the drawing. The drive shaft 1 carries in the region of its free end an eccentric 4 and, adjacent to the eccentric 4, eccentric means comprising a plate 3 and a pin 5 projecting radially displaced from the axis of the drive shaft 1 from the plate. A roller 6 is turnably mounted on the pin 5 of the eccentric means 3, 5, which roller is movable in a U-shaped guide 7 which extends normal to the drawing plane. The guide 7 is fixedly connected to an elongated rod 8, carrying at its lower end, fixedly connected thereto by means of a clamping device 10, a saw blade 9 extending in longitudinal direction of the rod 8. The rod 8 is guided for reciprocation in longitudinal direction in a pair of bushings 11 and 12 carried by a frame 13, which in turn is pivotally mounted in the region of its upper end for pivoting or oscillating movement about a fixed pivot axis extending substantially normal to the longitudinal axis of the rod. A compression spring 15, abutting with one end against a fixed portion of the housing of the saw and with the other end against an extension 16 on the frame 13, presses this extension 16 against an adjustable eccentric 17 mounted in the housing and serving to limit pivoting of the frame 13 about the pivot axis 14 in one direction.

The eccentric 4 is located within an elongated slot 20 of a balancing body 21 which under the action of the turnable eccentric 4 is reciprocated in vertical direction. The longitudinal axis of the slot 20 extends in direction normal to the drawing plane. The balancing body 21 abuts with its rear face against a roller 22 turnably mounted on a portion of the housing. The front face of the elongated balancing body 21 is provided with an inclined face portion 23 so that the cross section of the balancing body 21 tapers toward the lower end thereof. The face portion 23 is engaged by a roller 19 mounted on the frame 13 adjacent the guide bushing 12. The roller 19 is turnable about an axis normal to the direction of reciprocation of the rod 8.

In the compass saw illustrated in principle in FIG. 1, the frame 13, mounted in the housing of the saw for movement of the pivot axis 14, and guiding the rod 8 for reciprocation in longitudinal direction, forms together with the spring 15 and the roller 19 pendulum or rocking means. The roller 19 serves as engaging means engaging the inclined face portion 23 of the balancing body which together with the eccentric 4 and the roller 22 form means for counter balancing the forces produced by the movement of the rod and the saw blade connected thereto.

The compass saw schematically illustrated in FIG. 1, in which the upward movement of the rod 8 forms the working stroke of the saw blade 9, is operated as follows:

Starting from the position of the various elements, as illustrated in FIG. 1, the saw blade 9 will be moved by the eccentric means 5 along an inactive stroke in which the rod 8 moves downwardly, while the eccentric 4 moves the balancing body 21 to its upper end position. During a further turning of the drive shaft 1, the saw blade performs its working stroke and the saw blade 9 is first moved vertically upwardly. At the same time, the eccentric 4 moves the balancing body 21 downwardly so that the inclined face portion will be engaged by the roller 19 on the frame 13. The frame 13 together with the rod 8 mounted thereon, will thereby be rocked about the axis 14, so that the saw blade will perform, in addition to its vertical reciprocation, also a horizontal movement, whereby the cuttting action performed by the saw blade is improved as compared with compass saws in which the saw blade is movable only in vertical direction. The reciprocating balancing body 21 will during such movement balance the mass forces produced by the reciprocating rod 8 with the saw blade 9 and the clamp 10. The horizontal movement performed by the saw blade may be adjusted by means of the eccentric 17. In the position of the eccentric 17 shown in the drawing, the smallest additional movement of the saw blade 9 will be performed since in this position of the eccentric 17 the roller 19 on the frame 13 will engage only part of the inclined face portion 23 during reciprocation of the balaning body 21. When the adjustable eccentric 17 is turned through an angle of 180° from the position shown in FIG. 1, the largest additional horizontal movement of the saw blade 9 will be obtained since in the thus-adjusted position of the eccentric 17, the roller 19 will cooperate with the full length of the inclined face portion 23.

FIGS. 2–6 illustrate an embodiment of a compass saw according to the present invention as illustrated in a schematic manner in FIG. 1. This embodiment comprises a drive shaft 1 driven from a motor, not shown in the drawing, and turnably mounted in a bearing 2 supported, in a manner not shown in the drawing, within the housing 35 of the compass saw. The drive shaft 1 carries to one side of the bearing 2 a fan wheel 24 and on the other side, on its free end, a pinion 25 which meshes with a gear 26 fixed on a shaft 29 for turning therewith. The shaft 29 is turnably mounted in a pair of bearings 27 and 28 which are connected in any convenient manner to the aforementioned housing 35. The shaft 29 carries the eccentrics 4 and 5, the eccentricities of which extend in opposite direction from the axis of the shaft 29. The balancing body 21 is in this embodiment formed by a pair of plates, one of which abuts with its rear face against the front face of the gear 26 and with the end of its rear face also against a roller 22 mounted in the housing 35 turnable about an axis extending parallel to the rear face. The other of the two plates forming the balancing body 21 is provided on its front face with an inclined face portion, which forms the bottom face of a groove 30, which extends downwardly and rearwardly inclined from the eccentric 4, and the latter extends through an elongated slot in the two plates. The two plates of the balancing body 21 are guided on side faces thereof on pins 31 fixed in the housing 35 and having longitudinal axes extending normal to the plane of the two plates forming the balancing body 21. As clearly shown in FIG. 4, the elongated slot 20 in which the eccentric 4 is located has a longitudinal axis which extends normal to the direction of the elongation of the balancing body 21. The rod 8, to the lower end of which the saw blade 9 is fixedly connected by the clamp 10, is guided for reciprocating movement in longitudinal direction in the guide bushings 32 and 33 of the frame 13 which has, as clearly shown in FIGS. 5 and 6, a cross section of substantially U-shaped configuration. The frame 13 is mounted by means of a bearing 34 on a pin 14 for tilting movement about the axis of the pin, and a compression spring 15 abutting with opposite ends against a portion of the housing 35 and the frame 13, respectively, biases the frame 13 for tilting movement in counterclockwise direction about the axis of the pin 14. A roller 6 turnably mounted on the eccentric pin 5 is located and guided in a member 7 of U-shaped cross section extending normal to the axis of the rod 8 and fixed thereto for movement therewith.

Figure 3:
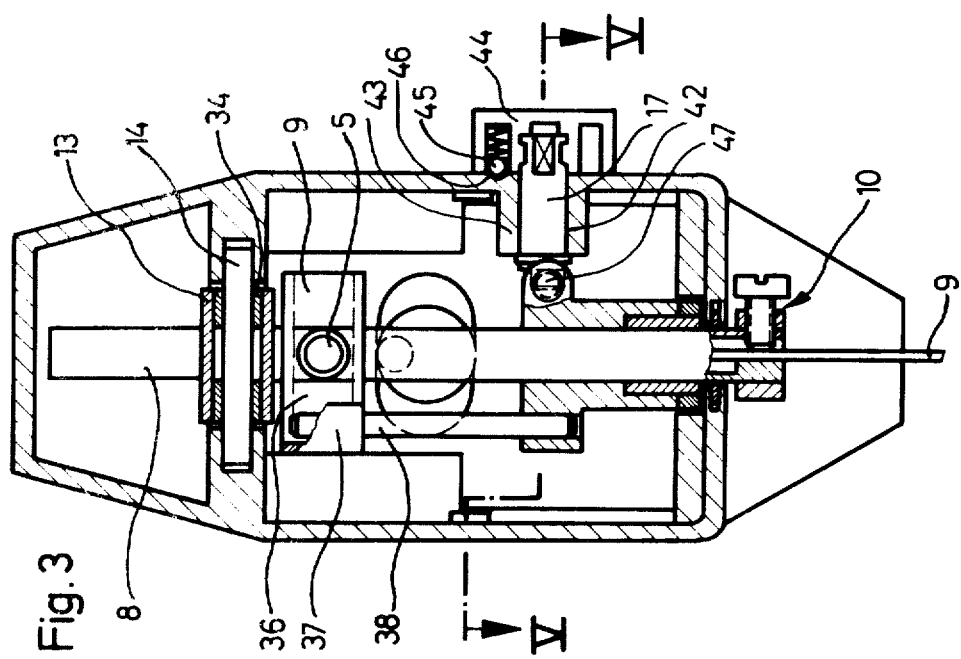
FIG. 3 is a cross section taken along the line III—III of FIG. 2.

The rod 8 is preferably of circular cross section and to prevent turning of this rod about its axis in the guide bushings 32 and 33, a strap 36 connected to the rear face of the U-shaped guide member 7 (FIG. 6) encompasses with a half-circular extension 37 an elongated pin 38 fixed to the frame 13, as best shown in FIG. 3, and serving as a guide.

A roller 39 made from heat-insulating plastic material is arranged at the lower end of the bushing 33 closely adjacent to the inner surface of the housing 35. During the pendulating movement of the frame 13 and the rod 8 together with the saw blade 9, the roller will roll on lateral guide faces, shown in FIG. 3, which extend in the direction of the pendulating movement of the frame 3 and thereby the roller will take up any lateral forces applied to the saw blade so that a bending of the latter or lateral deviation thereof will be avoided. In addition, the roller 36 will also protect the housing 35, which is preferably formed from thermoplastic material, from the heat developed by friction in the bushing 33. A seal 41, constructed to permit the pendulating movement of the rod 8, is arranged beneath the roller 39 in an opening 40 of the housing 35 through which the rod passes, so as to prevent foreign bodies, for instance sawdust, to enter into the interior of the housing.

The eccentric 17 which serves to adjust the pendulating movement of the frame 13 and the elements carried thereby is, in the illustrated embodiment, turnably mounted in an inwardly directed annular bearing portion 43 integral with the housing, and turnable from the outside of the housing 35 by means of an adjusting knob 44 which is integrally connected with the eccentric 17. The turned positions of the knob 44 may be releasably fixed by means of a spring pressed ball 45 arranged in a bore of the knob 44 and cooperating with a plurality of depressions 46 arranged circumferentially spaced about the axis of the knob 44 in the outer surface of the housing 35, as clearly shown in FIG. 3. A fine adjusting screw 47 threadingly engaged in a bore of the frame 13, which can be held in any adjusted position by a lock nut 48, abuts with its free end against the peripheral surface of the eccentric 17.

The operation of the embodiment illustrated in FIGS. 2–6 corresponds exactly to the operation of the compass saw as described in connection with FIG. 1. Accordingly, the roller 19 turnably mounted on the frame 13 engages the inclined bottom face of the groove 30 of the balancing body 21 so that the frame 13 together with the rod 8 and the saw blade 9 connected thereto will tilt about the tilting axis 14 under the influence of the inclined face in the groove 30 of the balancing body 21 of the means for counter balancing the mass forces produced by the movement of the rod and saw blade connected thereto.

It will be understood that each of the elements described above, or two or more together, may also find a useful application in other types of compass saws differing from the type described above.

While the invention has been illustrated and described as embodied in a compass saw provided with means for counter balancing the mass forces produced by the movable elements of the compass saw during operation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is set forth in the appended claims:

1. A compass saw comprising a housing; a drive shaft rotatably mounted in said housing and having eccentric means; an elongated rod connected to said eccentric means to be reciprocated thereby; a saw blade fixed to one end of said rod for reciprocation therewith; rocking means mounted in said housing for pivoting movement about a pivot axis and guiding said rod for reciprocation in longitudinal direction; means in said housing for counterbalancing the mass forces produced by the movement of said rod and said saw blade connected thereto, said counterbalancing means comprising an eccentric on said drive shaft and an elongated balancing body extending substantially parallel to said rod and being reciprocated by said eccentric in opposition to the movement of said rod, said balancing body having spaced from said eccentric a free end, and on one side thereof between said eccentric and said free end, a face inclined to the direction of its elongation; engaging means on said rocking means engaging said inclined face of said balancing body for causing said rocking means to pivot about said pivot axis during reciprocating movement of said rod and said saw blade connected thereto; and means in said housing cooperating with said rocking means for adjusting the pivoting movement the latter performs about said pivoting axis.

2. A compass saw as defined in claim 1, wherein said rocking means comprises a frame provided with means for guiding said rod for movement in longitudinal direction and wherein said engaging means comprises a roller mounted on said frame, and including spring means between said housing and said frame for biasing said frame about the pivot axis so as to press said roller against said counter balancing means.

3. A compass saw as defined in claim 2, wherein said roller is mounted on said frame for rotation about an axis substantially normal to the direction of reciprocation of said rod.

4. A compass saw as defined in claim 1, wherein said rod has a circular cross section, and including cooperating means on said rod and said frame for preventing said rod to turn about its axis.

5. A compass saw as defined in claim 1, wherein said inclined face forms the bottom of a groove formed in said balancing body.

6. A compass saw as defined in claim 5, and including a roller mounted in said housing turnably about an axis extending substantially normal to the direction of reciprocation of said elongated balancing body, said roller engaging said elongated balancing body on the side opposite to the side on which said groove is provided.

7. A compass saw as defined in claim 6, wherein said rocking means comprises a frame provided with means for guiding said rod for movement in longitudinal direction and wherein said engaging means comprises a roller mounted on said frame turnably about an axis substantially normal to the longitudinal axis of said rod, and including spring means between said housing and said frame for biasing the latter about said pivot axis so as to press said roller on said frame against the bottom face of said groove.

8. A compass saw as defined in claim 6, wherein said elongated balancing body is provided with an elongated slot extending substantially normal to the direction of movement of said elongated balancing body, said eccentric being located in said slot.

9. A compass saw as defined in claim 8, and including means in said housing for guiding said elongated balancing body for movement in longitudinal direction.

10. A compass saw as defined in claim 9, wherein said balancing body comprise two parallel plates abutting each other.

11. A compass saw as defined in claim 9, wherein said means for guiding said elongated balancing body comprises pins extending normal to the direction of movement of said balancing body and respectively engaging opposite side faces thereof.

12. A compass saw as defined in claim 10, and including a further eccentric mounted on said housing and cooperating with said frame for limiting the movement of the latter about said pivot axis, and a knob accessible from the outside of said housing and connected to said further eccentric for turning the latter to thus adjust the pivoting movement of said frame about said pivot axis.

13. A compass saw as defined in claim 12, and including a fine adjusting screw mounted on said frame and engaging said further eccentric.

* * * * *